United States Patent
Yu et al.

(10) Patent No.: US 12,157,676 B2
(45) Date of Patent: Dec. 3, 2024

(54) PREPARATION METHOD FOR ZINC MANGANATE NEGATIVE ELECTRODE MATERIAL

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/558,328

(22) PCT Filed: Aug. 25, 2022

(86) PCT No.: PCT/CN2022/114924
§ 371 (c)(1),
(2) Date: Oct. 31, 2023

(87) PCT Pub. No.: WO2023/093161
PCT Pub. Date: Jun. 1, 2023

(65) Prior Publication Data
US 2024/0217837 A1    Jul. 4, 2024

(30) Foreign Application Priority Data

Nov. 24, 2021    (CN) .......................... 202111411793.2

(51) Int. Cl.
*C01G 45/12*    (2006.01)
*H01M 4/505*    (2010.01)
(Continued)

(52) U.S. Cl.
CPC ......... *C01G 45/1235* (2013.01); *C01G 45/12* (2013.01); *H01M 4/505* (2013.01);
(Continued)

(58) Field of Classification Search
CPC .... C01G 45/12; C01G 45/1235; H01M 4/505
See application file for complete search history.

(56) References Cited

U.S. PATENT DOCUMENTS

| 5,672,329 A | 9/1997 | Okada et al. |
| 2014/0205909 A1* | 7/2014 | Yonehara ............ H01M 10/4235 429/300 |

FOREIGN PATENT DOCUMENTS

| CN | 107792887 | 3/2018 |
| CN | 108899532 | 11/2018 |

(Continued)

OTHER PUBLICATIONS

Machine translation of Yu et al to CN114229907, pulication date Mar. 25, 2022.*

(Continued)

*Primary Examiner* — Jun Li
(74) *Attorney, Agent, or Firm* — Leason Ellis LLP

(57) ABSTRACT

A method for preparing a zinc manganate anode material is disclosed. The method includes the following steps: (1) preparing a solution A containing a manganese ion and a solution B containing zinc alkali; (2) dispersing an adsorp- (Continued)

tion carrier into the solution B; (3) using an alkali solution as a base solution and adding the solution A, the solution B and an oxidant solution to the base solution while stirring; (4) conducting a solid-liquid separation of the materials after reaction to obtain a solid; and (5) washing, drying and calcining the solid to obtain a zinc manganate anode material.

6 Claims, 2 Drawing Sheets

(51) Int. Cl.
*H01M 10/0525* (2010.01)
*H01M 10/054* (2010.01)
(52) U.S. Cl.
CPC ...... *C01P 2004/03* (2013.01); *C01P 2006/40* (2013.01); *H01M 10/0525* (2013.01); *H01M 10/054* (2013.01)

(56) References Cited

FOREIGN PATENT DOCUMENTS

| CN | 109119608 | | 1/2019 | |
| CN | 110474017 A | * | 11/2019 | ............ H01M 10/36 |
| CN | 109119608 B | * | 10/2020 | ............ H01M 4/364 |
| CN | 109560273 B | * | 3/2021 | ............ B82Y 30/00 |
| CN | 112694131 | | 4/2021 | |
| CN | 113373517 | | 9/2021 | |
| CN | 114229907 | | 3/2022 | |
| DE | 10225302 | | 8/2003 | |
| EP | 2750225 A1 | * | 7/2014 | ........ H01M 10/0565 |
| WO | 2003029148 | | 4/2003 | |
| WO | WO-03029148 A2 | * | 4/2003 | ......... C01G 45/1235 |

OTHER PUBLICATIONS

Kokulnathan et al., Zinc Manganate: Synthesis, Characterization, and Electrochemical Application toward Flufenamic Acid Detection, Inorg. Chem. 2021, 60, 4723-4732.*
International Search Report and Written Opinion of the International Searching Authority issued for the PCT application No. PCT/CN2022/114924 on Nov. 16, 2023, (13 pages), with English translation.
First Office Action for the family patent No. 2021114117932 on May 9, 2023, (14 pages), with English translation.
First Search issued for the family patent No. 2021114117932 on May 6, 2023, (3 pages), with English translation.

* cited by examiner

PREPARATION METHOD FOR ZINC MANGANATE NEGATIVE ELECTRODE MATERIAL

CROSS-REFERENCE TO RELATED APPLICATION

This application is a national stage filing under 35 U.S.C. § 371 of international application number PCT/CN2022/114924, filed Aug. 25, 2022, which claims priority to Chinese patent application No. 202111411793.2 filed Nov. 24, 2021. The contents of these applications are incorporated herein by reference in their entirety.

TECHNICAL FIELD

The present disclosure belongs to the technical field of battery electrode materials, and particularly relates to a method for preparing a zinc manganate anode material.

BACKGROUND

Lithium/sodium ion batteries have been used as a new alternative energy due to their comprehensive performance advantages of high energy density, high voltage, long life, etc. An anode material applied in the market at present is mainly graphite carbon. However, the graphite carbon cannot meet continuously increasing requirements of high-efficiency lithium/sodium ion batteries due to defects of the graphite carbon. In order to pursue higher specific capacity, longer cycle life and better safety of lithium ion batteries, electrode materials with better performances need to be developed. Currently, most anode materials of lithium/sodium ion batteries produced industrially are carbon materials, but the carbon materials only have a theoretical specific capacity of 372 mAh·g$^{-1}$ as an anode and are difficult to satisfy a pursuit of higher capacity by people. In a process of searching for materials with a high specific capacity, transition metal oxides have become a research hotspot.

Transition metal oxides have a high theoretical capacity among many battery anode candidates and have received wide attention since reported. A zinc manganate ($ZnMn_2O_4$) electrode material is considered to be a novel anode material of lithium ion batteries with great research value and application prospect due to excellent characteristics of high specific capacity, abundant natural resources, environmental friendliness, lower working voltage and the like.

However, the zinc manganate anode material prepared by the existing technology has a large volume change and is easy to pulverize in a charging and discharging processes, such that a contact effect of an active substance and a current collector is poor, a cycle performance of the electrode is rapidly deteriorated and the cycle performance of a battery is affected.

SUMMARY

The present disclosure is intended to solve at least one of the technical problems existing in the existing technology. For this reason, the present disclosure provides a method for preparing a zinc manganate anode material. The zinc manganate anode material prepared by the method has an excellent cycle performance.

The technical objective of the present disclosure is achieved by means of the following technical solution:

A method for preparing a zinc manganate anode material includes the following steps: (1) preparing a solution A containing a manganese ion and a solution B containing zinc alkali; (2) dispersing an adsorption carrier into the solution B; (3) using an alkali solution as a base solution and adding the solution A, the solution B and an oxidant solution to the base solution while stirring; (4) conducting a solid-liquid separation of the materials after reaction to obtain a solid; and (5) washing, drying and calcining the solid to obtain a zinc manganate anode material.

Preferably, in step (2), the adsorption carrier may be cotton fiber.

Preferably, a ratio of a mass of the adsorption carrier to a volume of the solution B (i.e. a solid-to-liquid ratio) may be 25-100 g:1 L.

Preferably, in step (3), a reaction vessel used for the stirring may be provided with an overflow pipe and connected with a collection tank through the overflow pipe.

Preferably, in step (3), after the materials are added, aging may be conducted for 1-2 h.

Preferably, in step (1), the solution A may further contain a silver ion.

Preferably, in step (1), the manganese ion in the solution A may have a molar concentration of 0.1-2.0 mol/L and a molar concentration ratio of the manganese ion to the silver ion in the solution A may be 100:0.8-4.

Preferably, in step (1), a zinc ion in the solution B may have a concentration of 0.05-1.0 mol/L and a hydroxide ion may have a concentration of 0.33-6.1 mol/L.

Preferably, in step (3), the base solution may have a pH of 10.5-11.8, pH in a reactor may be adjusted by the oxidant solution such that the pH in the reactor may be always maintained at 10.5-11.8.

Preferably, in step (3), during the material adding process, flow rates of the solution A and the solution B may be maintained with a molar ratio of a manganese ion to a zinc ion at 1.5-2.5:1.

Preferably, the oxidant solution may be a hydrogen peroxide solution.

More preferably, hydrogen peroxide in the hydrogen peroxide solution may have a concentration of 10-30%.

Preferably, in step (5), the drying may be conducted in vacuum at 50° C.-90° C. for 2-6 h.

Preferably, in step (5), the calcinating may be conducted as follows: heating the dried solid to 250° C.-300° ° C. at a heating rate of 1° C.-3° C./min, keeping the temperature for 1-2 h, then heating the solid to 500° C.-600° ° C. at a heating rate of 2° C.-5° C./min and keeping the temperature for 2-4 h.

The present disclosure has the following beneficial effects:

1. A zinc manganate anode material prepared by a method for preparing a zinc manganate anode material of the present disclosure has an initial gram capacity of 553 mAh·g−1 or more, a battery gram capacity of 495 mAh·g−1 or more after 350 cycles, and a maximum battery capacity loss rate of only 10.49%, indicating that the zinc manganate anode material prepared by the method has an excellent cycle performance:

2. According to a method for preparing a zinc manganate anode material of the present disclosure, a manganese ion reacts with a zinc alkali solution to generate a zinc-manganese hydroxide coprecipitate, such that the zinc and the manganese are mixed at an atomic level, first precipitation of the zinc ion is avoided and a circulation stability of the material is ensured:

3. According to a method for preparing a zinc manganate anode material of the present disclosure, when a solution A further contains a silver ion, silver hydroxide can be generated in a coprecipitation process and decomposed into a silver simple substance in a subsequent calcination process to further improve conductivity and a cycle performance of the material;

4. According to a method for preparing a zinc manganate anode material of the present disclosure, a cotton fiber is dispersed into a zinc alkali solution, and under an action of a hydroxide ion, a hydrolysis modification of the cotton fiber is promoted and an adsorption capacity of the cotton is enhanced;

5. According to a method for preparing a zinc manganate anode material of the present disclosure, an overflow pipe is arranged on a coprecipitation reaction vessel, generated zinc hydroxide manganese precipitate particles cannot always stay in a reactor in a reaction process, such that growth of the precipitate particles is avoided and the final zinc manganate anode material is also a small-sized particle: when used as an anode material of batteries, the zinc manganate anode material can increase a contact area of an electrolyte, reduces an ion de-intercalation path, can avoid adverse effects caused by volume expansion and improves a cycle performance; and 6. According to a method for preparing a zinc manganate anode material of the present disclosure, a cotton fiber is used as an adsorption carrier, when co-calcined with a precipitate, the cotton fiber is carbonized, such that the carbon material is compounded with zinc manganate to support the zinc manganate particle, a cycle stability of the material is further improved and conductivity of the material is improved.

REFERENCE NUMERALS

101. reactor; 102. overflow pipe; 103. collection tank; 104. stirring paddle; 105. motor.

DETAILED DESCRIPTION

The present disclosure is further described below with reference to specific embodiments.

Embodiment 1

Figure 2:
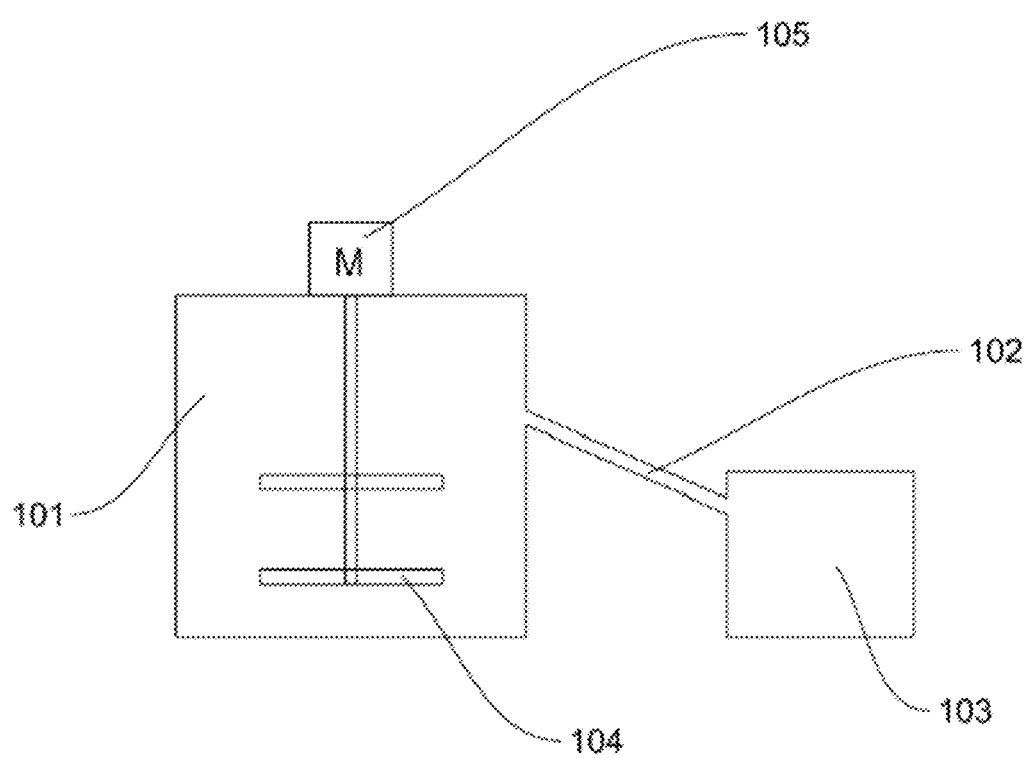
FIG. 2 is a schematic diagram of a reaction vessel in step (3) of Embodiment 1.

A method for preparing a zinc manganate anode material included the following steps:
(1) a solution A containing manganese nitrate and silver nitrate and a solution B containing zinc alkali were prepared; where in the solution A, the manganese nitrate had a concentration of 0.1 mol/L and a molar concentration ratio of the manganese nitrate to the silver nitrate was 100:0.8; and the solution B was a mixed solution of sodium tetrahydroxozincate and sodium hydroxide, a zinc ion had a concentration of 0.05 mol/L and a hydroxide ion had a concentration of 0.33 mol/L;
(2) a cotton fiber was dispersed into the solution B according to a solid-liquid ratio of 25 g:1 L;
(3) as shown in FIG. 2, a sodium hydroxide solution was added to a reactor 101 with an overflow pipe 102 as a base solution, where pH of the base solution was 11.5-11.8, a motor 105 was started to rotate a stirring paddle 104 for stirring, the solution A, the solution B and a hydrogen peroxide solution were added into the reactor 101, where flow rates of the solution A and the solution B were always kept with a molar ratio of a manganese ion to a zinc ion at 2:1, the hydrogen peroxide had a mass concentration of 10%, and pH in the reactor was adjusted by the hydrogen peroxide solution such that the pH in the reactor was always maintained at 11.5-11.8;
(4) a liquid level of the reactor 101 rose and the mixed solution entered a collection tank 103 through the overflow pipe 102;
(5) after the materials were added, aging was conducted for 1-2 h;
(6) the materials in the collection tank 103 and the reactor 101 were subjected to a solid-liquid separation to obtain a solid;
(7) after the solid was washed with water, the solid was dried in vacuum at 50° C. for 6 h; and
(8) the dried solid was placed in a tube furnace to be heated to 250° C. at a heating rate of 1° C./min, the temperature was kept for 2 h, then the heated solid was heated to 600° C. at a heating rate of 5° C./min, the temperature was kept for 2 h, and thus a zinc manganate anode material was obtained.

Embodiment 2

A method for preparing a zinc manganate anode material included the following steps:
(1) a solution A containing manganese nitrate and silver nitrate and a solution B containing zinc alkali were prepared; where in the solution A, the manganese nitrate had a concentration of 1.0 mol/L and a molar concentration ratio of the manganese nitrate to the silver nitrate was 100:2; and the solution B was a mixed solution of sodium tetrahydroxozincate and sodium hydroxide, a zinc ion had a concentration of 0.5 mol/L and a hydroxide ion had a concentration of 3.25 mol/L;
(2) a cotton fiber was dispersed into the solution B according to a solid-liquid ratio of 50 g:1 L;
(3) a sodium hydroxide solution was added to a reactor with an overflow pipe as a base solution, where pH of the base solution was 11.0-11.4, a motor was started to rotate a stirring paddle for stirring, the solution A, the solution B and a hydrogen peroxide solution were added into the reactor, where flow rates of the solution A and the solution B were always kept with a molar ratio of a manganese ion to a zinc ion at 2:1, the hydrogen peroxide had a mass concentration of 15%, and pH in the reactor was adjusted by the hydrogen peroxide solution such that the pH in the reactor was always maintained at 11.0-11.4;
(4) a liquid level of the reactor rose and the mixed solution entered a collection tank through the overflow pipe;
(5) after the materials were added, aging was conducted for 1-2 h;
(6) the materials in the collection tank and the reactor were subjected to a solid-liquid separation to obtain a solid;
(7) after the solid was washed with water, the solid was dried in vacuum at 70° C. for 4 h; and (8) the dried solid was placed in a tube furnace to be heated to 280° C. at a heating rate of 2° C./min, the temperature was kept for 1.5 h, then the heated solid was heated to 550° C. at a heating rate of 3° C./min, the temperature was kept for 3 h, and thus a zinc manganate anode material was obtained.

Embodiment 3

A method for preparing a zinc manganate anode material included the following steps:
(1) a solution A containing manganese nitrate and silver nitrate and a solution B containing zinc alkali were prepared; where in the solution A, the manganese nitrate had a concentration of 2.0 mol/L and a molar concentration ratio of the manganese nitrate to the silver nitrate was 100:4; and the solution B was a mixed solution of sodium tetrahydroxozincate and sodium hydroxide, a zinc ion had a concentration of 1.0 mol/L and a hydroxide ion had a concentration of 6.1 mol/L;
(2) a cotton fiber was dispersed into the solution B according to a solid-liquid ratio of 100 g:1 L;
(3) a sodium hydroxide solution was added to a reactor with an overflow pipe as a base solution, where pH of the base solution was 10.5-10.9, a motor was started to rotate a stirring paddle for stirring, the solution A, the solution B and a hydrogen peroxide solution were added into the reactor, where flow rates of the solution A and the solution B were always kept with a molar ratio of a manganese ion to a zinc ion at 2:1, the hydrogen peroxide had a mass concentration of 30%, and pH in the reactor was adjusted by the hydrogen peroxide solution such that the pH in the reactor was always maintained at 10.5-10.9;
(4) a liquid level of the reactor rose and the mixed solution entered a collection tank through the overflow pipe;
(5) after the materials were added, aging was conducted for 1-2 h;
(6) the materials in the collection tank and the reactor were subjected to a solid-liquid separation to obtain a solid;
(7) after the solid was washed with water, the solid was dried in vacuum at 90° C. for 2 h; and
(8) the dried solid was placed in a tube furnace to be heated to 300° C. at a heating rate of 3° C./min, the temperature was kept for 1 h, then the heated solid was heated to 600° C. at a heating rate of 5° C./min, the temperature was kept for 2 h, and thus a zinc manganate anode material was obtained.

Embodiment 4

A method for preparing a zinc manganate anode material included the following steps:
(1) a solution A containing manganese nitrate and a solution B containing zinc alkali were prepared; where in the solution A, the manganese nitrate had a concentration of 2.0 mol/L; and the solution B was a mixed solution of sodium tetrahydroxozincate and sodium hydroxide, a zinc ion had a concentration of 1.0 mol/L and a hydroxide ion had a concentration of 6.1 mol/L;
(2) a cotton fiber was dispersed into the solution B according to a solid-liquid ratio of 100 g:1 L;
(3) a sodium hydroxide solution was added to a reactor with an overflow pipe as a base solution, where pH of the base solution was 10.5-10.9, a motor was started to rotate a stirring paddle for stirring, the solution A, the solution B and a hydrogen peroxide solution were added into the reactor, where flow rates of the solution A and the solution B were always kept with a molar ratio of a manganese ion to a zinc ion at 2:1, the hydrogen peroxide had a mass concentration of 30%, and pH in the reactor was adjusted by the hydrogen peroxide solution such that the pH in the reactor was always maintained at 10.5-10.9;
(4) a liquid level of the reactor rose and the mixed solution entered a collection tank through the overflow pipe;
(5) after the materials were added, aging was conducted for 1-2 h;
(6) the materials in the collection tank and the reactor were subjected to a solid-liquid separation to obtain a solid;
(7) after the solid was washed with water, the solid was dried in vacuum at 90° C. for 2 h; and
(8) the dried solid was placed in a tube furnace to be heated to 300° C. at a heating rate of 3° C./min, the temperature was kept for 1 h, then the heated solid was heated to 600° C. at a heating rate of 5° C./min, the temperature was kept for 2 h, and thus a zinc manganate anode material was obtained.

Embodiment 5

A method for preparing a zinc manganate anode material included the following steps:
(1) a solution A containing manganese nitrate and silver nitrate and a solution B containing zinc alkali were prepared; where in the solution A, the manganese nitrate had a concentration of 2.0 mol/L and a molar concentration ratio of the manganese nitrate to the silver nitrate was 100:4; and the solution B was a mixed solution of sodium tetrahydroxozincate and sodium hydroxide, a zinc ion had a concentration of 1.0 mol/L and a hydroxide ion had a concentration of 6.1 mol/L;
(2) a cotton fiber was dispersed into the solution B according to a solid-liquid ratio of 100 g:1 L;
(3) a sodium hydroxide solution was added to a reactor with a single container chamber as a base solution, where pH of the base solution was 10.5-10.9, a motor was started to rotate a stirring paddle for stirring, the solution A, the solution B and a hydrogen peroxide solution were added into the reactor, where flow rates of the solution A and the solution B were always kept with a molar ratio of a manganese ion to a zinc ion at 2:1, the hydrogen peroxide had a mass concentration of 30%, and pH in the reactor was adjusted by the hydrogen peroxide solution such that the pH in the reactor was always maintained at 10.5-10.9;
(4) after the materials were added, aging was conducted for 1-2 h;
(5) the materials in the reactor were subjected to a solid-liquid separation to obtain a solid;
(6) after the solid was washed with water, the solid was dried in vacuum at 90° C. for 2 h; and
(7) the dried solid was placed in a tube furnace to be heated to 300° C. at a heating rate of 3° C./min, the temperature was kept for 1 h, then the heated solid was heated to 600° C. at a heating rate of 5° C./min, the temperature was kept for 2 h, and thus a zinc manganate anode material was obtained.

Comparative Example 1

A method for preparing a zinc manganate anode material included the following steps:
(1) a solution A containing manganese nitrate and silver nitrate and a solution B containing zinc alkali were prepared; where in the solution A, the manganese nitrate had a concentration of 2.0 mol/L and a molar concentration ratio of the manganese nitrate to the silver nitrate was 100:4; and the solution B was a mixed solution of sodium tetrahydroxozincate and sodium hydroxide, a zinc ion had a concentration of 1.0 mol/L and a hydroxide ion had a concentration of 6.1 mol/L;
(2) a sodium hydroxide solution was added to a reactor with an overflow pipe as a base solution, where pH of the base solution was 10.5-10.9, a motor was started to rotate a stirring paddle for stirring, the solution A, the solution B and a hydrogen peroxide solution were added into the reactor, where flow rates of the solution A and the solution B were always kept with a molar ratio of a manganese ion to a zinc ion at 2:1, the hydrogen peroxide had a mass concentration of 30%, and pH in the reactor was adjusted by the hydrogen peroxide solution such that the pH in the reactor was always maintained at 10.5-10.9;
(3) a liquid level of the reactor rose and the mixed solution entered a collection tank through the overflow pipe;
(4) after the materials were added, aging was conducted for 1-2 h;
(5) the materials in the collection tank and the reactor were subjected to a solid-liquid separation to obtain a solid;
(6) after the solid was washed with water, the solid was dried in vacuum at 90° C. for 2 h; and
(7) the dried solid was placed in a tube furnace to be heated to 300° C. at a heating rate of 3° C./min, the temperature was kept for 1 h, then the heated solid was heated to 600° C. at a heating rate of 5° C./min, the temperature was kept for 2 h, and thus a zinc manganate anode material was obtained.

EXPERIMENT

Figure 1:
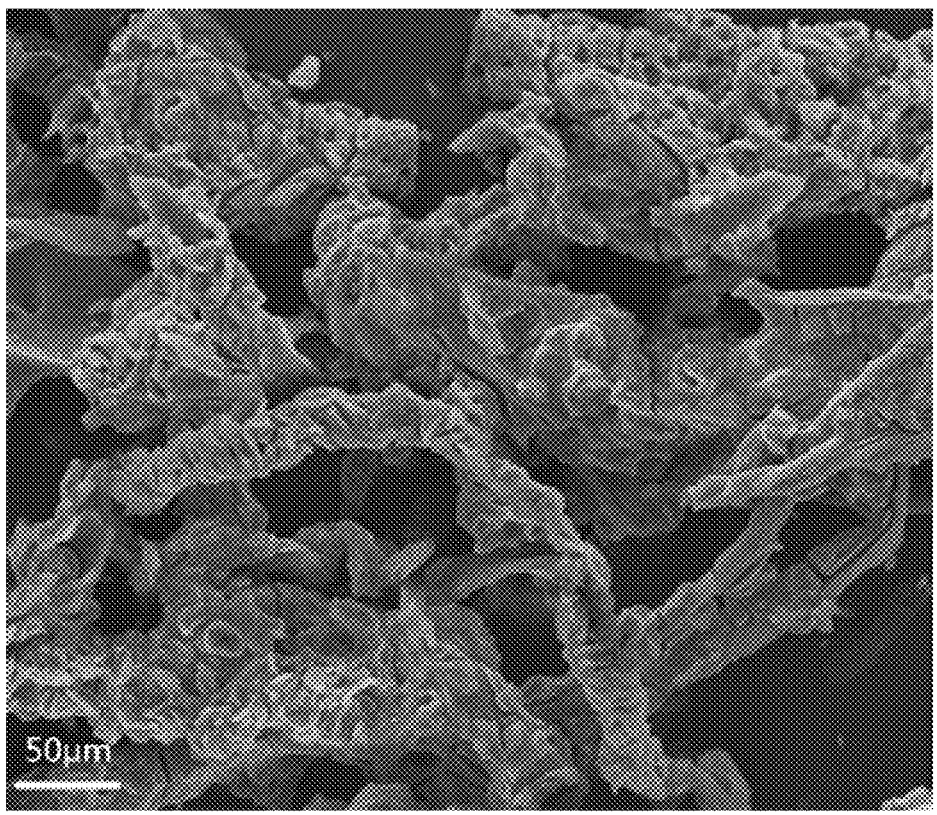
FIG. 1 is a scanning electron microscopy (SEM) image of a zinc manganate anode material prepared in Embodiment 1.

The morphology of the zinc manganate anode material prepared in Embodiment 1 was observed through a scanning electron microscope and the result was shown in FIG. 1.

The zinc manganate anode materials prepared in Embodiments 1-5 and Comparative example 1 were taken and respectively assembled into lithium-ion half batteries. A cycle performance was tested at a high current density of 1,000 mA/g and a working voltage range of 0.01-3.0 V. The results were shown in Table 1.

It can be seen from Table 1 that the lithium-ion half batteries assembled by the zinc manganate anode material prepared by the method of the present disclosure had an initial gram capacity of 553 mAh·g−1 or more, had a battery gram capacity of 495 mAh·g−1 or more after 350 cycles, and had a maximum battery capacity loss rate of only 10.49%.

Comparing Embodiment 3 and Embodiment 4, it can be seen that under other conditions unchanged, when the solution A did not contain a silver ion, the finally prepared lithium-ion half batteries assembled by the zinc manganate anode material had reduced initial gram capacity and cycle performance.

Comparing Embodiment 3 and Embodiment 5, it can be seen that under other conditions unchanged, when the reactor with a single container chamber was used and no overflow pipe and collection tank was additionally contained, the finally prepared lithium-ion half batteries assembled by the zinc manganate anode material had reduced initial gram capacity and cycle performance.

Comparing Embodiment 3 and Comparative example 1, it can be seen that under other conditions unchanged, when no adsorption carrier was used during a preparation process, the finally prepared lithium-ion half batteries assembled by the zinc manganate anode material had reduced initial gram capacity and cycle performance.

The above embodiments are preferred implementations of the present disclosure. However, the implementations of the present disclosure are not limited by the above embodiments. Any change, modification, substitution, combination and simplification made without departing from the essence and principle of the present disclosure should be an equivalent replacement manner, and all are included in a protection scope of the present disclosure.

The invention claimed is:
1. A method for preparing a zinc manganate anode material, comprising the following steps:
(1) preparing a solution A containing a manganese ion and a solution B;
(2) dispersing an adsorption carrier into the solution B;
(3) using an alkali solution as a base solution and adding the solution A, the solution B and an oxidant solution to the base solution while stirring;
(4) conducting a solid-liquid separation on a material after reaction to obtain a solid; and
(5) washing, drying and calcining the solid to obtain the zinc manganate anode material;
wherein in step (1), the solution A further contains a silver ion, and the solution B is a mixed solution of sodium tetrahydroxozincate and sodium hydroxide;
wherein in step (2), the adsorption carrier is cotton fiber;

TABLE 1

Battery cycle performance

| Item | Initial gram capacity (mAh · g−1) | Gram capacity after 350 cycles (mAh g−1) | Battery gram capacity loss rate (%) |
|---|---|---|---|
| Embodiment 1 | 593 | 537 | 9.44 |
| Embodiment 2 | 605 | 549 | 9.26 |
| Embodiment 3 | 621 | 566 | 8.86 |
| Embodiment 4 | 562 | 506 | 9.96 |
| Embodiment 5 | 553 | 495 | 10.49 |
| Comparative example 1 | 389 | 290 | 25.45 | wherein in step (3), a reaction vessel used for the stirring is provided with an overflow pipe and connected with a collection tank through the overflow pipe;

wherein in step (5), the calcining comprises: heating the solid after drying to 250° C. to 300° C. at a heating rate of 1° C./min to 3° C./min for 1 h to 2 h, then heating the solid to 500° C. to 600° C. at a heating rate of 2° C./min to 5° C./min for 2 h to 4 h.

2. The method for preparing the zinc manganate anode material of claim 1, wherein a ratio of a mass of the adsorption carrier to a volume of the solution B is (25-100) g:1 L.

3. The method for preparing the zinc manganate anode material of claim 1, wherein in step (1), the manganese ion in the solution A has a molar concentration of 0.1 mol/L to 2.0 mol/L and a molar concentration ratio of the manganese ion to the silver ion in the solution A is 100:0.8-4.

4. The method for preparing the zinc manganate anode material of claim 1, wherein in step (1), a zinc ion in the solution B has a concentration of 0.05 mol/L to 1.0 mol/L and a hydroxide ion has a concentration of 0.33 mol/L to 6.1 mol/L.

5. The method for preparing the zinc manganate anode material of claim 1, wherein in step (3), the base solution has a pH of 10.5 to 11.8, a pH in a reactor is adjusted by the oxidant solution such that the pH in the reactor is always maintained at 10.5 to 11.8.

6. The method for preparing the zinc manganate anode material of claim 5, wherein the oxidant solution is a hydrogen peroxide solution.

* * * * *